United States Patent
Girot

(10) Patent No.: US 7,312,399 B2
(45) Date of Patent: Dec. 25, 2007

(54) DEVICE FOR FASTENING ELONGATE ELEMENTS TO A STRUCTURE

(75) Inventor: Gaël Girot, Gardanne (FR)

(73) Assignee: Eurocopter, Marignane (FR)

( * ) Notice: Subject to any disclaimer, the term of this patent is extended or adjusted under 35 U.S.C. 154(b) by 0 days.

(21) Appl. No.: 11/291,996

(22) Filed: Dec. 2, 2005

(65) Prior Publication Data

US 2006/0144615 A1 Jul. 6, 2006

(30) Foreign Application Priority Data

Dec. 30, 2004 (FR) .................................. 04 14074

(51) Int. Cl.
*H01B 7/00* (2006.01)

(52) U.S. Cl. ...................... 174/154; 174/135; 174/155; 174/156

(58) Field of Classification Search ................ 174/154, 174/155, 156, 135, 36, 209, 210; 248/49, 248/318

See application file for complete search history.

(56) References Cited

U.S. PATENT DOCUMENTS

| 4,367,859 | A | * | 1/1983 | Lamon ...................... 248/318 |
| 4,854,015 | A | | 8/1989 | Shaull |
| 5,200,245 | A | | 4/1993 | Brodrick, Jr. et al. |
| 5,879,335 | A | | 3/1999 | Martinez et al. |
| 2002/0043592 | A1 | * | 4/2002 | Frazier ...................... 248/68.1 |

* cited by examiner

*Primary Examiner*—Jinhee Lee
(74) *Attorney, Agent, or Firm*—Young & Thompson

(57) ABSTRACT

A device (1) for fastening elongate elements (2) such as cables or bundles of cables or the like to a structure (S) includes at least a first flexible self-gripping strip (3) having a loop-closure system on a first face (30) and a second flexible selfgripping strip (4) with a hookclosure system on a first face (40) The first and second flexible strips (3 and 4) adhere at least in par.t one against the other via their second faces (35 and 45) that are self-adhesive, so as to form a flexible collar (C) by uniting at least their facing free end zones (51 and 52) The device further includes a rigid plate (10) for constituting a support for fastening the device (1) to the structure (S).

11 Claims, 3 Drawing Sheets

DEVICE FOR FASTENING ELONGATE ELEMENTS TO A STRUCTURE

BACKGROUND OF THE INVENTION

The present invention relates to a device for fastening elongate elements such as cables or bundles of electrical cables, optical cables, or other cables, ducts or pipework for fluids or the like, the device enabling said elongate elements to be held and guided relative to a support structure.

More generally, the invention relates in particular to manufacturing vehicles, in the automotive industry, in ship building, and more particularly in the aircraft industry. An aircraft includes a multiplicity of pieces of equipment and various apparatuses that for control purposes, require very many circuits of all types (electrical, optical, fluid conveying, . . . ) for transmitting information essential to proper operation of the vehicle as a whole. Consequently, it is important to secure these multiple circuits and to guide them appropriately relative to the structure of said aircraft.

Naturally, the device is not limited to this particular application. Thus, it can be used whenever an elongate element needs to be fastened and optionally guided relative to a structure along a predetermined path.

Numerous types of support are known for use in particular in electrical installations for fastening electrical cables or bundles of electrical cables to walls.

One of the best known devices for fastening elongate elements is constituted by a collar having a bundle of electrical cables passing therethrough. Under such circumstances, the ability to hold the bundle of electrical cables requires the inside diameter of the collar to correspond to the outside diameter of the bundle. Consequently, it is necessary to have a large series of collars of different diameters in order to be able to use the collar of appropriate diameter for each bundle of electrical cables. In addition, it is important to understand that with small-diameter bundles of electrical cables it is frequently essential to include padding in order to fill in the empty space in the collar that is not filled by said bundle, in particular for the purpose of avoiding any damage to the bundle, e.g. under the effect of the support structure vibrating. It should be observed that such vibration is also likely to eject the padding from the collar, which means that such a solution is not entirely satisfactory.

Furthermore, in particular from French patent No. 2 678 704 in the name of the Applicant, a device is also known for supporting elongate elements, which device is constituted by a segment of bar across which said elements can be placed transversely, the bar having recesses formed therein for passing means for clamping said elongate elements. That device comprises a plurality of parallel teeth each having one end connected to said bar, while the other ends of the teeth, remote from said bar, are free, said teeth defining between them said recesses which are thus open beside said free ends. Thus, the device is in the form of a comb enabling the clamping means, such as flexible strip collars, initially to be mounted loosely around the elongate elements that are to be fastened, and then to be inserted into the open recesses while surrounding at least one of the teeth secured to the segment of bar, prior to being finally clamped thereto. Thus, a segment of bar can hold a plurality of bundles of elongate elements, each bundle being clamped by a collar matching its own diameter and being held by at least one tooth of the comb. Such a comb can be made out of synthetic material so as to be easily deformable both elastically and plastically so as to be capable of being deformed if so required by the shape of the support structure.

Although those devices give satisfaction in terms of holding and guiding elongate elements, they nevertheless present drawbacks in terms of the clamping means and of being put into place.

The clamping means are usually metal collars or self-tightening plastics collars.

In practice, for each type of collar and for each manufacturer, there exist as many different references as there are different collar diameters, generally one reference per diameter in millimeter by millimeter steps, which requires the user to devote a large amount of rigorous management to stocks and orders.

Furthermore, putting metal collars into place presents several difficulties for the user, and in particular, for example:

it is essential to use a wrench or a screwdriver for the purposes of clamping, unclamping, or dismantling collars in order to be able to extract at least one elongate element;

there is a risk of damaging elements, in particular cables used in the microwave frequency range or indeed buses which are cables that are very fragile and very expensive, where such damage can significantly diminish the intrinsic characteristics of the cables concerned;

there is a danger of galvanic couples being set up between said metal collars and the various components in their environment;

the installation is heavy because of the numerous parts needed for fastening metal collars:

e.g. inserts and filling associated therewith for fastening collars in panels of composite materials with screws and washers, or adhesive dowels of the CLICK BOND™ type, for example, that are lighter in weight but more expensive, together with nuts and washers; and screws and nut-strips for fastening collars to a thin structure (made of metal or of composite material);

successive and expensive modifications in cable layouts during the design and development stages of the cabling, e.g. because of dimensional dispersion due to manufacture in the diameters of the electrical bundles, leading to differences between design values and actual values after manufacture; and mounting collars made of stainless steel, to the detriment of weight, but in order to avoid any galvanic couples.

Similarly, the use of plastics collars leads to several drawbacks such as the following, for example:

putting a self-tightening plastics collar into place requires a special tightening tool to be used and a different tool for cutting off the excess length of tongue, or else a special tool for performing both operations;

as a general rule, removing a self-tightening collar requires it to be cut open with snips, thus making the collar unusable, and runs the risk of damaging the elongate element(s) contained in said collar; and there is a risk of the collar damaging certain types of very specific and very expensive electrical bundle (cables for use at microwave frequencies, buses, . . . ), or a risk of flattening hoses, such as those for example in the anemometer installations of aircraft.

In addition, the use of devices made of plastics material, such as those described in above-mentioned document FR 2 678 704, where such devices in very widespread use in the presence of numerous electrical cables, for example, requires different sizes of comb to be designed, leading to significant design time for making tooling plans, for manufacture, and for rigorous management of stocks.

Document WO 87/06559 discloses a clamping collar for a bundle of elongate elements that is constituted by strips of fabric made of Velcro™ type synthetic material. However, that type of collar presents specific drawbacks. For example, it should be observed that the elongate elements come at least in part in contact with the hook fastening means, thereby making the contact surface of the collar rough where it engages said elongate elements, running the risk of causing damage, particularly when coaxial cables with a particularly fine and fragile center wire are included in such a bundle. Furthermore, fastening such a collar to a structure turns out to be difficult in the absence of suitable means.

SUMMARY OF THE INVENTION

An object of the present invention is to remedy those drawbacks, and the invention relates to a device for fastening elongate elements that makes it possible to simplify installation plans, stock management, and the installation of said devices for fastening elongate elements to the structure of an aircraft, for example, while still being of acceptable weight.

To this end, the invention provides a device for fastening elongate elements such as cables or bundles of electrical cables, optical cables, or other cables, ducts, or pipes for fluid, or the like, to a structure, the device comprising at least a first flexible self-gripping strip with a loop-closure system on a first face, and a second flexible self-gripping strip with a hook-closure system on a first face, each of the first and second flexible strips having a respective second face that is self-adhesive, and first and second flexible strips being identical in width, that is remarkable in that said first and second flexible strips adhere at least in part one against the other via their self-adhesive second faces so as to form a first flexible tape by uniting at least the facing first and second free end zones of said first and second flexible strips.

Consequently, the first tape is obtained by uniting, via their self-adhesive second faces: the first free end zone of the first flexible strip and the first free end zone of the second flexible strip; and the second free end zone of the first flexible strip and the second free end zone of the second flexible strip.

In addition, a rigid plate (made of metal, plastics material, composite material, etc.) is advantageously inserted, e.g. by adhesive, between said first and second flexible strips to constitute local stiffening serving as a support to enable said device to be fastened to said structure.

Thus, a plurality of elongate elements can be contained in a winding of said first flexible tape placed around the corresponding bundle, said winding constituting a collar that is closed by the first and second flexible Velcro™ type strip or the like, and as described, for example, in French patent No. 1 064 360. In addition, the device of the invention is not permanently fastened to the elongate elements which avoids damaging them and makes it easy to reuse a device, should that be necessary.

To do this, with the length of flexible tape being longer than the outer perimeter of the elongate elements (perimeter of a section of a single cable or of a single duct, for example, or perimeter outside a bundle, depending on circumstances), the collar is closed by said first and second free end zones adhering one against the other by hooking due to contact:
either between the first self-gripping face with a loop-closure system of the first free end zone of the first flexible strip and the first self-gripping face with a hook-closure system of the second free end zone of the second flexible strip;
or else between the first self-gripping face with a hook-closure system of the first free end zone of the second flexible strip and the first self-gripping face with a loop-closure system of the second free end zone of the first flexible strip.

Advantageously, the use of the device of the invention makes it easier to draw up plans for installing cables or cable bundles or the like in a structure such as an aircraft, for example. Thus, a single model of device, and consequently of collar, can be provided, and as a result only one reference needs to be taken into account. The length of flexible tape can be excessive on manufacture so as to have only one model of collar available. The desired collar is then obtained by using the appropriate length on demand, with a pair of scissors sufficing to cut off a length from one or both of the free ends, where necessary. In parallel, stock management is considerably simplified since only one quantity needs to be monitored, relating to a single model of device.

In addition, it should be observed that the device can be used with said collar being opened and closed on multiple occasions without damaging the device, which is practically impossible with usual systems, if only because there is a risk of losing reliability.

It should also be observed that the device can be handled with one hand only. In addition, the elongate element can be extracted merely by opening the collar, there is no need to remove the collar.

In a first embodiment, the length of the second flexible strip is longer than the length of the first flexible strip so that the excess length of the second flexible strip advantageously surrounds said rigid plate in order to constitute an offset fastening support, for fastening said device to said structure, that is offset relative to said collar.

Furthermore, said offset fastening support may have a hole, said rigid plate and said second flexible strip being pierced in register so as to allow the collar to be secured to the structure by clamping means engaged in said hole.

In addition, said rigid plate may present a projection on either side of the second flexible strip, enabling said device to be held specifically in a suitable support member.

According to another characteristic of this first embodiment, said first flexible tape presents only the first flexible self-gripping strip with loop-closure means to come into contact with the elongate elements, unlike the device described in WO 87/06559. I.e. it is the female face of said first flexible tape that provides contact that is soft, and consequently that is not aggressive against said elongate elements, and this is particularly advantageous in the presence of fragile elongate elements, for example.

In a second embodiment of the invention, said first and second flexible strips of said first flexible tape are identical in length. Under such conditions, said rigid plate is inserted between the first and second flexible strips, e.g. being substantially centered between the first and second free ends of said first flexible tape, so as to constitute a non-offset fastening support for fastening said device to a structure, where said support is not offset.

Furthermore, a hole is provided in said non-offset fastening support, with the first and second flexible strips being pierced so that corresponding holes are in register with a hole made through said rigid plate so as to secure the collar to the structure by clamping means engaged in said hole.

Under such circumstances, said first flexible tape again presents the first flexible self-gripping strip with the loop-closure system for coming into contact with the elongate elements, possible with the exception of the clamping means engaged in the hole provided in the non-offset fastening support.

Similarly, said rigid plate may present a projection on either side of the first flexible tape enabling said device to be held specifically in an appropriate support member.

In a third embodiment, special protection is provided for the elongate elements in the region of the hole in the above-described second embodiment.

For this purpose, a second flexible tape for protection purposes is inserted perpendicularly to the first flexible tape between the rigid plate and the first flexible strip so as to form an external flexible tongue, thereby constituting a protective flap over the region of the hole.

To do this, said second flexible tape comprises firstly a third flexible self-gripping strip with a loop-closure system on a first face which is stuck on the face of the rigid plate and which is towards the second flexible strip, said third flexible strip presenting a self-adhesive second face which adheres to the self-adhesive second face of the first flexible strip and, secondly, a fourth flexible self-gripping strip with a hook-closure system on a first face which adheres via its self-adhesive second face to the self-adhesive second face of the third flexible strip over the entire external flexible tongue, which external flexible tongue is folded onto the first face of the first flexible strip so that the first face of the fourth flexible strip adheres by contact to the first face of the first flexible strip over the non-offset fastening.

Consequently, in the folded-down position, the external flexible tongue covers the clamping means engaged in the hole in the non-offset fastening support in such a manner that the elongate elements come into contact firstly with the first face of the first flexible strip of the first flexible tape, and secondly with the first face of the third flexible strip of the second flexible tape in the region of the hole, where both of these two flexible tapes correspond to a loop-closure system facing towards the elongate elements, i.e. they are not aggressive relative thereto.

This third embodiment may also include a rigid plate with projections on either side of the first flexible tape enabling said device to be held specifically in a suitable support member.

Advantageously, said suitable support member comprises firstly a cradle having two grooves each receiving one of the projections of said metal plate, and secondly a spring blade which is provided with a stud engaged in the hole of the, offset or non-offset, fastening support of said device for fastening it to a structure, thereby holding said flexible collar in said support member. The support member may be fastened to said structure by any of the usual means (screws, bolts, adhesive, . . . ).

Naturally, a user having collars constituting the third embodiment can deploy them in the manner of the second embodiment merely by cutting off the external flexible tongue. Stock management can then be restricted to devices constituting the first and third embodiments only.

BRIEF DESCRIPTION OF THE DRAWINGS

Other features and advantages of the present invention appear from the following description of embodiments given by way of illustration and with reference to the accompanying figures, in which.

DESCRIPTION OF THE PREFERRED EMBODIMENTS

Figure 1:
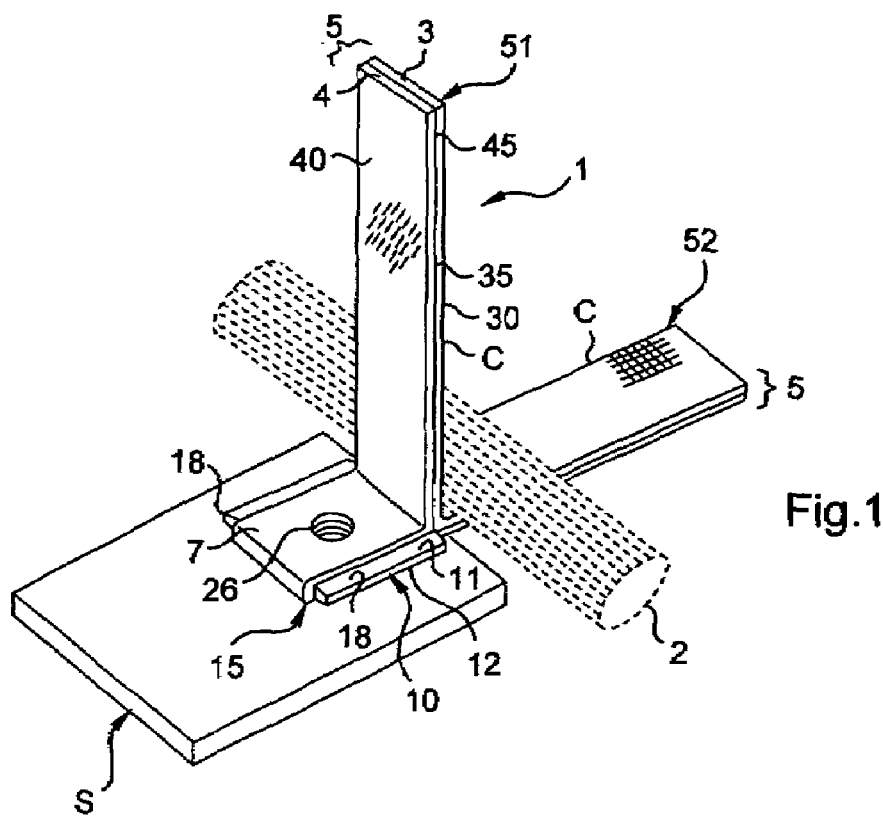
FIG. 1 shows a first embodiment of the device of the invention, in a perspective view.

The device 1 for fastening elongate elements as shown in FIG. 1 corresponds to a first embodiment of the invention and comprises a first flexible self-gripping strip 3 with a loop-closure system on a first face 30, and a second flexible self-gripping strip 4 with a hook-closure system on a first face 40, each of these first and second flexible strips having a respective second face 35 or 45 that is self-adhesive, and both of them being identical in width. By way of example, each of them may be a Velcro™ type strip, either having a hook-closure system (a "male" system) or a loop-closure system (a "female" system).

Said first and second flexible strips 3 and 4 adhere at least in part one against the other via their self-adhesive second faces 35 and 45 so as to form a first flexible tape 5 by uniting together at least the facing first and second free end zones 51 and 52 of said first and second flexible strips 3 and 4.

The length of the flexible tape 5 is longer than the outer perimeter of the elongate elements 2, such that the first and second free end zones 51 and 52 adhere one against the other by the first face 30 of the first free end zone 51 of the first flexible strip 3 coming into contact with the first face 40 of the second free end zone 52 of the second flexible strip 4, or by contact between the first face 40 of the first free end zone 51 of the second flexible strip 4 and the first face 30 of the second free end zone 52 of the first flexible strip 3, so as to constitute a flexible collar C surrounding said elongate elements 2 in contact with the face 30 of said first flexible strip 3. The collar C constituted in this way is shown in FIG. 2.

Figure 2:
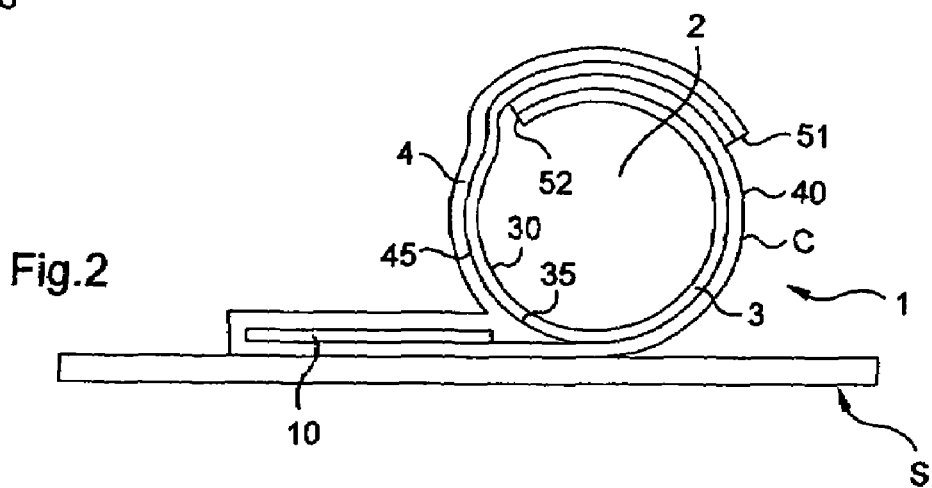
FIG. 2 shows a collar being put into place around elongate elements, in the first embodiment.

In addition, a rigid plate 10 is inserted with adhesive between said first and second flexible strips 3 and 4 to constitute local stiffening serving as a support to enable said device 1 to be fastened to said structure S, as shown in FIGS. 1 and 2.

More precisely, the length of the second flexible strip 4 is longer than the length of the first flexible strip 3, with the excess in length of the second flexible strip 4 surrounding the two faces 11 and 12 of said rigid plate 10 so as to constitute an offset fastening support 15 for fastening said device 1 to said structure S, said fastening support 15 being offset relative to said flexible collar C.

Furthermore, said second flexible strip 4 and said rigid plate 10 present a hole 26 at the level of the offset fastening support 15 to enable the flexible collar C to be secured to said structure S by clamping means engaged in said hole 26.

Figure 7:
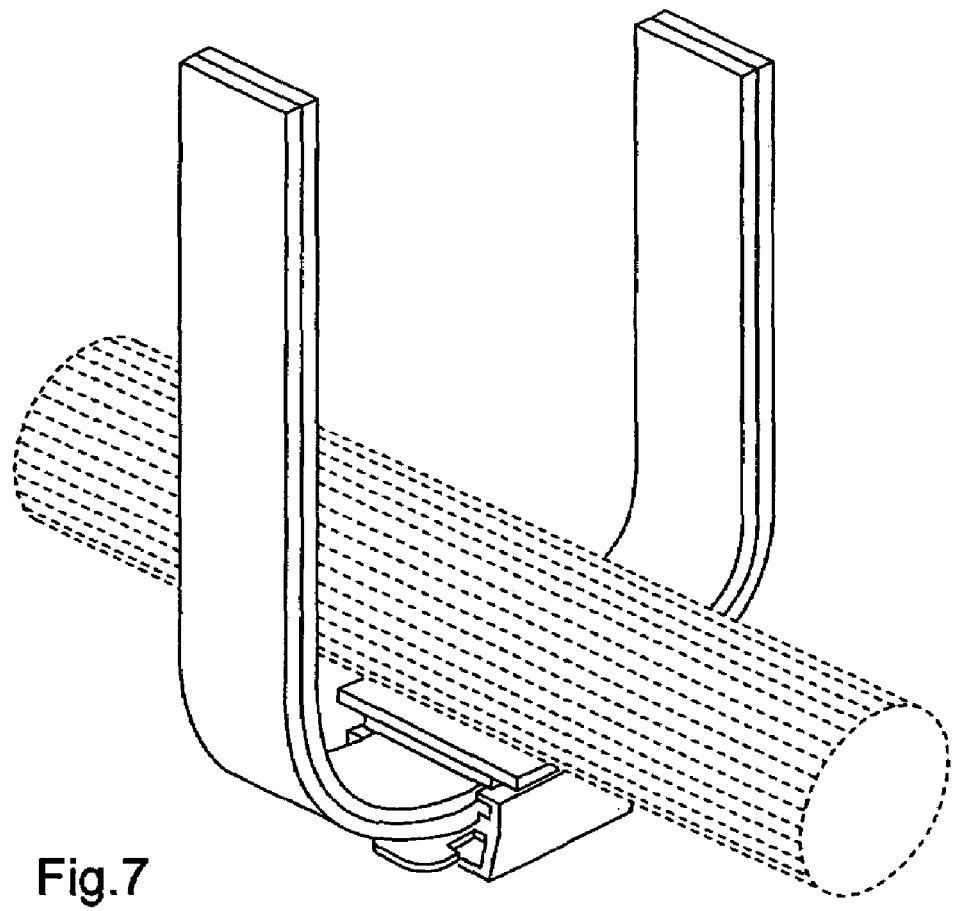
FIG. 7 shows the device constituting the third embodiment of the invention fitted with the support member of FIG. 3.

In a variant, the width of the rigid plate 10 is greater than the width of said first flexible tape 5 so that said rigid plate 10 presents on either side of the first flexible tape 5 a projection 18 enabling said device 1 to be held in a support member 70 as shown in FIGS. 1 and 7.

Figure 3:
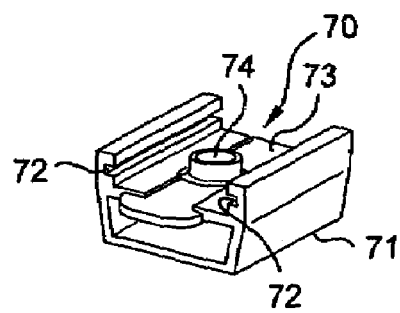
FIG. 3 shows a support member of the device of the invention.

To this end, and as shown in FIG. 3, said support member 70 comprises firstly a cradle 71 with two grooves 72, each receiving one of the projections 18 of said rigid plate 10, and secondly a spring blade 73 provided with a stud 74 that engages in the hole 26 to hold said flexible collar C in said support member 70. Thereafter, the device 1 is held stationary in said support member 70 which can itself be held stationary relative to said structure S by any of the usual means, and in particular by adhesive.

Under such conditions, said device 1 constituting this first embodiment puts the first face 30 of the first flexible strip 3 into contact with said elongate elements, i.e. the female face having the loop-closure system, which is soft and not aggressive relative to the elongate elements.

Figure 4:
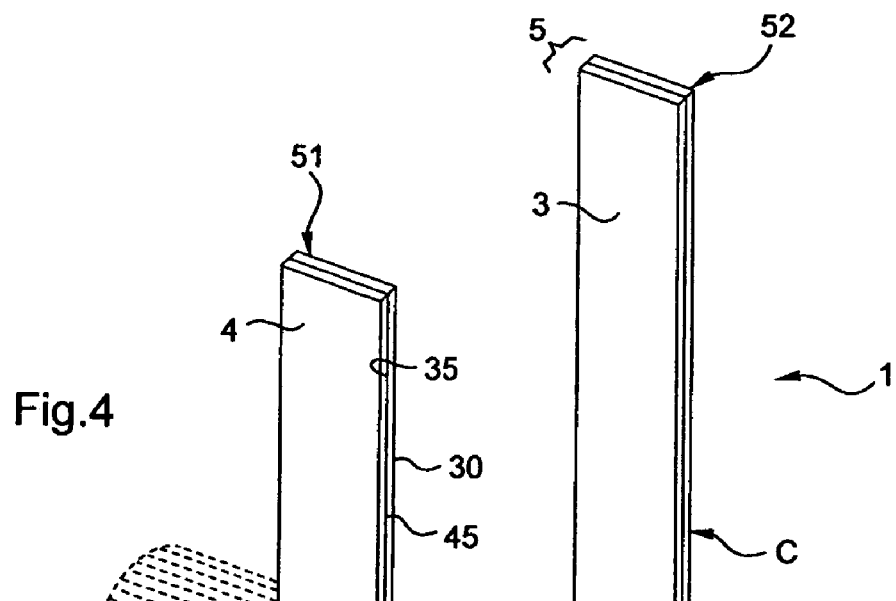
FIG. 4 shows a second embodiment of the invention, with an elongate element shown partially in section.

In a second embodiment shown in FIG. 4, the flexible strips 3 and 4 are identical in length and said rigid plate 10 is inserted with adhesive between said flexible strips 3 and 4, being substantially centered between the free ends 51 and 52 so as to constitute a non-offset fastening support 16 for fastening to said structure S (not shown in FIG. 4), without said device 1 being offset.

Thus, a collar C is obtained by adhesion between the face 30 of the free end 51 on the face 40 of the free end 52, or of the face 40 of the free end 51 on the face 30 of the free end 52.

At the level of the non-offset fastening support 16 shown in FIG. 4, the flexible strips 3 and 4 and also the rigid plate 10 presents a hole 36 for securing said flexible collar C to said structure S by clamping means engaged in said hole 36.

In a variant, the rigid plate 10 may naturally present a projection 18 on either side of the flexible tape 5 in the same manner as in the first embodiment, thus enabling said device 1 to be held in the above-described support member 70.

Once again, the user can make use of a single type of device corresponding to this second embodiment and can adapt it to any type of elongate element by cutting at least one of the free ends of the first flexible tape 5 to size by using a simple tool.

Figure 5:
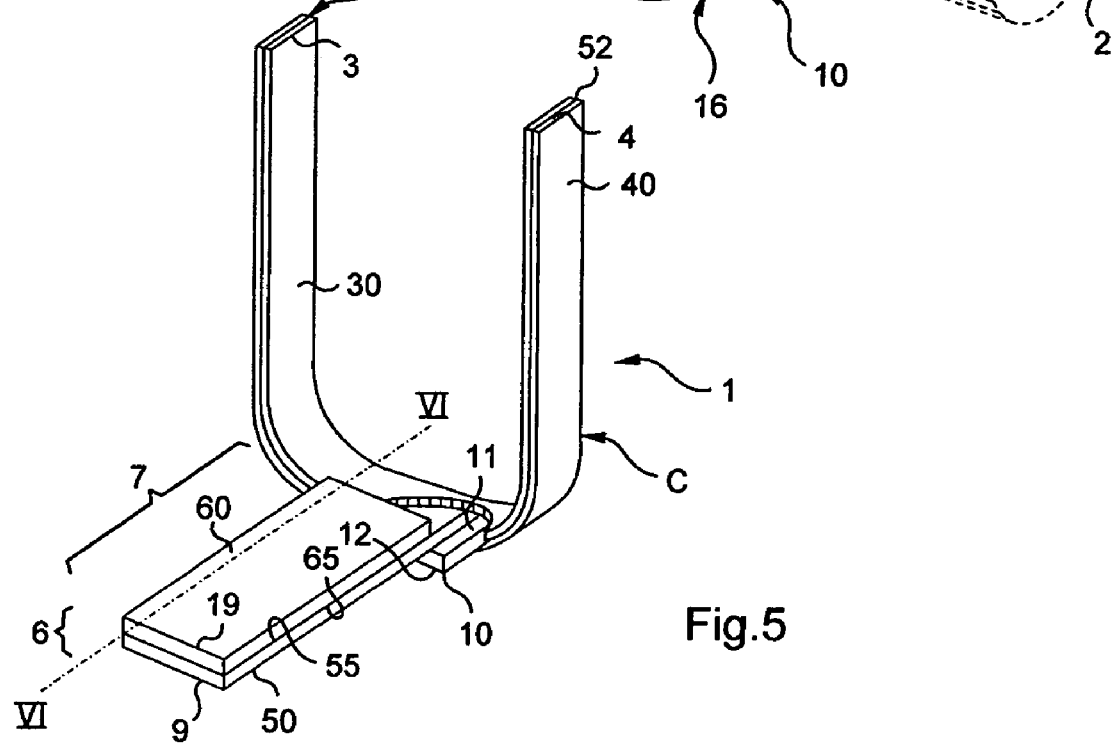
FIG. 5 shows a third embodiment of the invention.

A third embodiment is shown in FIG. 5. It is derived from the second embodiment by introducing a second flexible tape 6 for protective purposes perpendicularly to the first flexible tape 5, between the rigid plate 10 and the first flexible strip 3, thereby forming an external flexible tongue 7 constituting a protective flap 8, as shown diagrammatically in FIG. 6.

Figure 6:
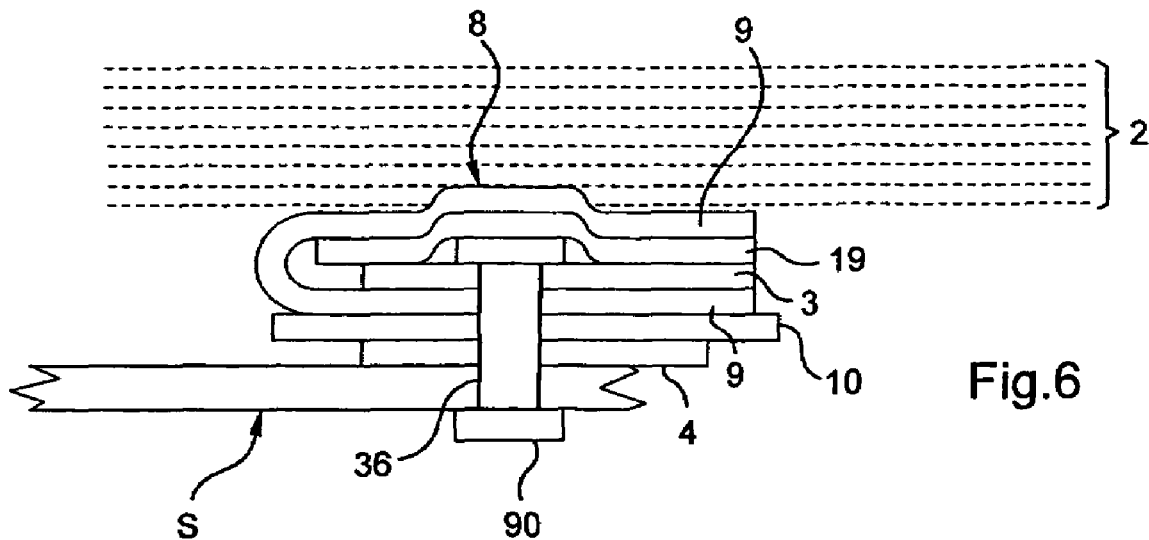
FIG. 6 is a section on line VI-VI of FIG. 5, the second tape being folded down.

The second flexible tape 6 for providing protection comprises firstly a third flexible self-gripping strip 9 with a loop-closure system on a first face 50 which is stuck on a face 11 of the rigid plate 10 and which is towards the second flexible tape 4, the third flexible strip 9 presenting a second face 55 that is self-adhesive that adheres to the self-adhesive second face 35 of the first flexible strip 3, and secondly a fourth flexible self-gripping strip 19 having a hook-closure system on a first face 60 which adheres via its self-adhesive second face 65 to the self-adhesive second face of the third flexible strip 9 over the entire external flexible tongue 7 which is folded onto the first face 30 of the first flexible strip 3 so that the first face 60 of the fourth flexible strip 19 adheres by contact with the first face 30 of the first flexible strip 3, over the non-offset fastening support, as shown in FIG. 6.

As a result, the third and fourth flexible strips 9 and 19 form a protective flap 8 which protects said elongate elements 2 from clamping means of the kind represented by reference 90 in FIG. 6.

Furthermore, at the level of said non-offset fastening support 16, the first, second, and third flexible strips 3, 4, and 9, and the rigid plate 10 present a hole 36 for securing said flexible collar C to said structure S by engaging clamping means in said hole 36.

It should then be observed that said elongate elements are once again in contact with the face 30 of the first flexible tape 5 and the face 50 of the second flexible tape 6, i.e. in contact with faces that carry loop-closure systems, i.e. that are not aggressive.

In a variant, the rigid plate 10 again presents a projection 18 on either side of the first flexible tape 5 enabling said device 1 to be held in the above-described support member 70. Such a mount is illustrated in FIG. 7.

In this way, should this be necessary, the user can deploy only two types of device in accordance with the invention, i.e. the first and third embodiments, since the device constituting the second embodiment can itself be obtained from the third by cutting off the external flexible tongue 7.

It is recalled that the device 1 in any of the embodiments described above can be used for mounting and dismounting elongate elements multiple times without producing the slightest damage.

Naturally, the present invention can be varied in numerous ways as to its implementation. Although several embodiments are described above, it will readily be understood that it is not conceivable to identify all possible embodiments exhaustively. It is naturally possible to envisage replacing any of the means described by equivalent means without going beyond the ambit of the present invention.

What is claimed is:

1. A device (1) for fastening elongate elements (2) to a structure (S), the device comprising:
    a first flexible self-gripping strip (3) with a loop-closure system on a first face (30)
    a second flexible self-gripping strip (4) with a hook-closure system on a first face (40), each of said first and second flexible strips having a respective second face opposite the respective first face (35, 45) that is self-adhesive, and said first and second flexible strips being identical in width,
    wherein the self-adhesive second faces (35, 45) of said first and second flexible strips (3 and 4) adhere to each other at first and second free end zones (51 and 52) of said first and second flexible strips (3 and 4) to form a first flexible tape (5) and do not adhere to each other in a third zone between said first and second free end zones, and
    a rigid plate (10) adhesively held between said first and second flexible strips (3 and 4) in said third zone to constitute local stiffening serving as a support for enabling said device (1) to be fastened to said structure (S).

2. The device according to claim 1, wherein the length of the first flexible tape (5) is greater than the outer perimeter of the elongate elements (2) so that said first and second free end zones (51 and 52) adhere one against the other by contact between the first face (30) of the first free end zone (51) of the first flexible strip (3) and the first face (40) of the second free end zone (52) of the second flexible strip (4) or by contact between the first face (40) of the first free end zone (51) of the second flexible strip (4) and the first face (30) of the second free end zone (52) of the first flexible strip (3), in such a manner as to form a flexible collar (C) surrounding said elongate elements (2) in contact with the first face (30) of said first flexible strip (3).

3. The device according to claim 2, wherein, in said third zone, the length of the second flexible strip (4) is longer than the length of the first flexible strip (3), the excess length of the second flexible strip (4) surrounding the two faces (11 and 12) of said rigid plate (10) to constitute an offset fastening support (15) for fastening said device (1) to said structure (S), said fastening support (15) being offset relative to said flexible collar (C).

4. The device according to claim 2, wherein the first and second flexible strips (3 and 4) are identical in length, and in that said rigid plate (10) is inserted between said first and second flexible strips (3 and 4) to constitute a non-offset fastening support for fastening said device (1) to said structure (S) without offset.

5. The device according to claim 3, wherein said second flexible strip (4) and said rigid plate (10) present a hole (26) through the offset fastening support (15) for securing the flexible collar (C) to said structure (S) by clamping means engaged in said hole (26).

6. The device according to claim 1, wherein a width of the rigid plate (10) is greater than the width of said first flexible tape (5) such that said rigid plate (10) presents on either side of the first flexible tape (5), a projection (18) enabling said device (1) to be held in a support member (70).

7. The device according to claim 1, wherein, in said third zone, said second flexible strip is longer than said first flexible strip providing a loop of said second flexible strip in said third zone, wherein said rigid plate is inside said loop, and wherein two opposite faces of said rigid plate are each adhesively held by adhesive on the second face of said second flexible strip.

8. The device according to claim 7, wherein, in said third zone, said rigid plate has a first through-hole for fastening the device to a structure, and said second flexible strip has two second through-holes in registration with said first through-hole.

9. A device for fastening elongate elements to a structure, the device comprising:
  a first flexible self-gripping strip with a loop-closure system on a first face;
  a second flexible self-gripping strip with a hook-closure system on a first face,
  wherein each of said first and second flexible strips has a second face opposite the first face and a same width, and wherein the second faces of said first and second flexible strips adhere to each other in first and second end zones of said first and second flexible strips and do not adhere to each other in a third zone between said first and second end zones; and
  a rigid plate in said third zone, said rigid plate adhering to the second face of at least one of said first and second flexible strips and having a first through-hole for fastenin9 the device to a structure, said at least one of said first and second flexible strips having a second through-hole in registration with said first through-hole.

10. The device according to claim 9, wherein, in said third zone, one of said first and second flexible strips is longer than the other of said first and second flexible strips providing a loop of said one of said first and second flexible strips in said third zone, wherein said rigid plate is inside said loop, and wherein two opposite faces of said rigid plate are each adhesively held by adhesive on the second face of said one of said first and second flexible strips.

11. The device according to claim 10, wherein said one of said first and second flexible strips has two said second through-holes.

* * * * *